United States Patent [19]

Bucchianeri et al.

[11] 4,103,552

[45] Aug. 1, 1978

[54] IN-SERVICE CLEANING OF A LIQUID LEVEL SENSOR

[75] Inventors: Bernard A. Bucchianeri, Carrol Township, Washington County; Robert A. Senchur, Plum Boro, both of Pa.

[73] Assignee: United States Steel Corporation, Pittsburgh, Pa.

[21] Appl. No.: 689,609

[22] Filed: May 24, 1976

[51] Int. Cl.[2] .......................... B08B 3/02; G01F 23/10
[52] U.S. Cl. ......................................... 73/309; 73/313; 134/113; 137/240
[58] Field of Search ................. 73/324, 313, 319, 309, 73/296, 306, 308; 134/113; 141/89, 91; 137/240

[56] References Cited

U.S. PATENT DOCUMENTS 3,393,564   7/1968   Simmons .............................. 73/324

*Primary Examiner*—Daniel M. Yasich
*Attorney, Agent, or Firm*—Walter P. Wood; William F. Riesmeyer

[57] ABSTRACT

An apparatus is disclosed for cleaning the movable parts of a displacement-type liquid level sensor while the sensor is maintained in continuous service. Alternatively, the sensor may be isolated from the process and cleaned without disassembly. In either use a cleaning fluid is introduced to the housing of the sensor containing the movable parts. The flow of the fluid flushes solid particles off of and away from the movable parts of sensor, thus providing reliable operation for measuring the level of chemical liquids such as Phosam solution (diammonium phosphate), that are likely to form solid materials during processing or storage.

1 Claim, 2 Drawing Figures without dismantling the sensor periodically to manually clean it.

The cleaning fluid used may be a liquid such as for example, water, light oil, or the chemical process liquid itself, or it may be a gas such as steam. Since the fluid flows through the housing of the liquid level sensor into the vessel a cleaning fluid should ordinarily be selected that is compatible with the chemical process liquid. If the cleaning fluid is compatible with the chemical process liquid, a continuous flow of cleaning fluid may be maintained. Or it may be desirable even though the cleaning fluid is compatible with the chemical process liquid, to introduce it only intermittently due to cost or other considerations. Where the cleaning fluid is composed of the chemical process liquid itself, however, it may be recycled from the process to the sensor. In this sense, the source of cleaning fluid may include the vessel in which the chemical process liquid is stored.

If the cleaning fluid is not compatible with the chemical process liquid then the sensor must be isolated from the process by closing valves 25 and 26 shown (in a typical installation) and introducing cleaning fluid until solid particles are flushed away. The cleaning fluid is drained from the float chamber by opening valve 27.

Solid particles tend to collect on the torque tube and on the pivot bearing which supports the torque tube. They may also collect on the displacer rod, displacer rod driver and on the rotary shaft. If sufficient amounts of solid particles collect on these movable parts they jam and do not move freely thus giving false indications of liquid level.

A valve is connected in the line of tubing between the container and the sensor housing. A manual valve may be used, particularly if continuous flow of cleaning fluid is to be maintained, or an automatic valve may be used to provide intermittent flow. The flow of cleaning fluid must be sufficient to flush solid particles away. The cleaning fluid is introduced at one or more locations in the housing as needed to provide adequate cleaning. The inlets may be located at various places on the housing and anywhere around the periphery of the housing or at various angles to the housing. Spray nozzles may be used to introduce a mist of cleaning fluid instead of a flow of liquid.

The invention has been used successfully in a displacement type liquid level sensor on a vessel containing phosphoric acid and ammonia. In this case, hot water was used as a cleaning fluid.

In another example, the liquid level sensor on a vessel used for separating light oil and water from a coke oven gas stream has been made reliable by using a portion of the light oil as a cleaning solvent.

We claim:

1. In a combination which includes a vessel for containing liquid and a liquid level sensor connected to said vessel, said sensor comprising:

means forming a chamber communicating with said vessel to receive liquid therefrom;

a displacer within said chamber movable up and down with changes in the level of liquid in said vessel;

a tubular housing located at the top of said chamber and communicating therewith;

rotary means within said housing and connected with said displacer; and a controller carried by said housing and operatively connected with said rotary means;

the improvement comprising:

two tubular fittings connected to said housing adjacent opposite ends thereof; and a source of cleaning liquid externally located with respect to said housing, said source serving to provide liquid under sufficient pressure for introduction into said housing; said tubular fittings each serving to increase the flow of cleaning liquid so as to inject a stream of cleaning liquid into the housing for flushing solid particles from said housing and from the rotary means within said housing; and means for selectively conducting cleaning liquid out of the housing.

* * * * *

IN-SERVICE CLEANING OF A LIQUID LEVEL SENSOR

BACKGROUND OF THE INVENTION

This invention relates to an apparatus for cleaning movable parts of a displacement-type liquid level sensor. Liquid level sensors are used in the chemical process industry to indicate and control the amount of process liquid in a vessel. The displacement type of sensor measures the buoyant force exerted by the liquid on a displacer which is partially or completely submerged in said liquid. An example of such a sensor is the "Level-Trol" model manufactured by Fisher Controls Company.

Some liquids used in chemical processes tend to form solid particles while they are stored in a vessel. This may occur by a number of mechanisms, some of which are:

(1) accumulation of particulate impurities from the liquid, (2) evaporation and drying of the liquid leaving salt precipitates, (3) freezing of the liquid, and (4) polymerization of liquid or the impurities contained therein.

The solid materials formed tend to collect on various parts of the liquid level sensor exposed to the environment inside the vessel. When this happens, the movable parts of the sensor jam and cause false indications of liquid level in the vessel. To correct this in the past it has been necessary to disconnect and remove the sensor from its service location so that it could be dismantled and cleaned manually.

SUMMARY OF THE INVENTION

Apparatus has been devised to introduce a cleaning fluid into the liquid level sensor housing so that solid particles are flushed away from the movable parts of the sensor. Thus it becomes possible to clean the sensor without removing it from its service location, whereby downtime and delays due to jamming of the movable parts are minimized, or essentially eliminated.

The cleaning fluid passes through the interior passages of the housing and washes the movable parts of the sensor. Preferably the cleaning fluid is selected so that it is compatible with the process liquid and it eventually passes into the vessel where it mixes with the process liquid. The cleaning fluid may be introduced at one or more locations in the housing and may be regulated so as to flow continuously or only intermittently.

It is an object of this invention to provide apparatus for in-service cleaning of the movable parts of a displacement-type liquid level sensor.

It is another object of this invention to provide apparatus for cleaning the movable parts of a displacement-type liquid level sensor while it is isolated from the process but not disassembled or removed from the service location.

It is another object of this invention to provide apparatus for introducing cleaning fluid at one or more locations into the housing of a displacement type liquid level sensor.

It is another object of this invention to provide apparatus for obtaining more reliable operation of a displacement type level sensor.

DETAILED DESCRIPTION OF THE INVENTION

Figure 1:
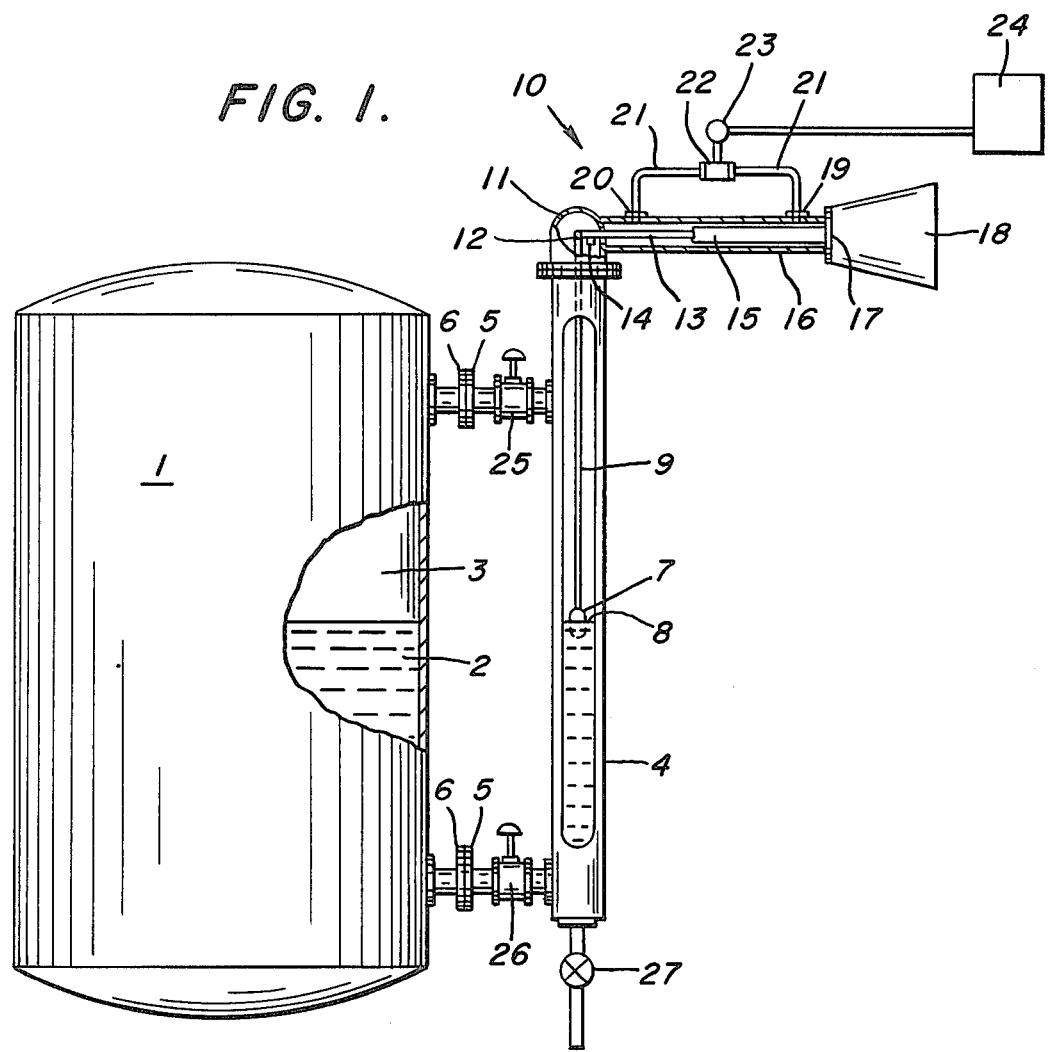
FIG. 1 is a side elevational view of a chemical process vessel and associated liquid level sensor apparatus.

FIG. 1 shows a vessel 1 which contains a liquid 2, used in a chemical process, for example such as phosphoric acid and ammonia as used in the Phosam ammonia recovery process. Above the liquid is vapor 3. A chamber 4 is attached to the side of the vessel 1 and has flanges 5 that meet flanges 6 of the vessel such that when the flanges are bolted together one unit is formed. An interior passageway through the lower flanges provides communication between the vessel 1 and chamber 4 so that liquid readily passes from the vessel 1 to the chamber 4. An interior passageway through the upper flanges, provides communication between the chamber 4 and vessel 1 so that vapor 3 from the chemical process liquid readily passes from the chamber 4 to the vessel 1.

The chamber 4 provides a space where the liquid contained therein is protected from turbulence. A displacer 7 is shown partially submerged below the liquid level 8 in the chamber 4. The displacer is connected to a displacer stem 9 which extends upwardly in the chamber into the housing of the liquid level sensor generally shown at 10.

In another embodiment, the liquid level sensor is located within the vessel itself and not within a separate chamber attached to the vessel.

Figure 2:
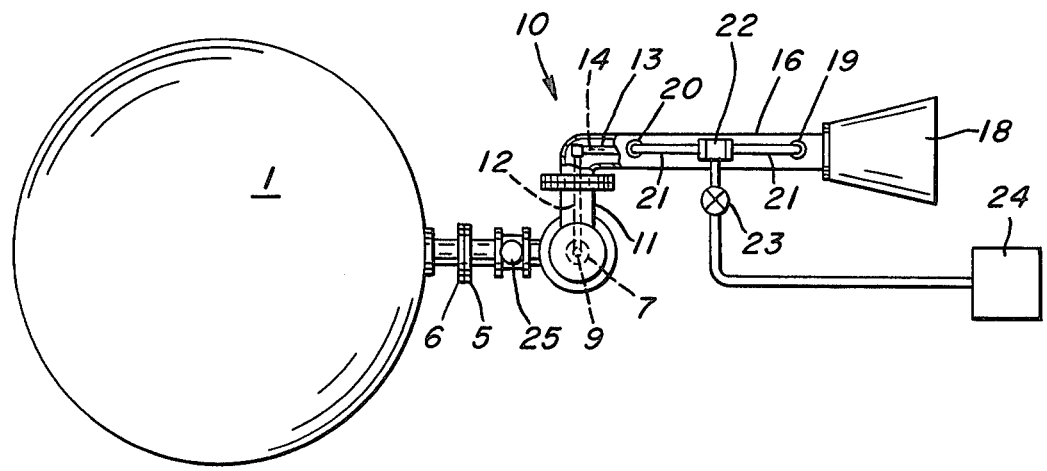
FIG. 2 is a top plan view of the apparatus shown in FIG. 1.

As shown in FIG. 2, a displacer stem 9 is encased in chamber 4. Connected to the upper portion of the chamber 4 is a housing 11 within which a displacer rod driver 12 is enclosed. The displacer rod driver 12 is connected to the end of the displacer stem 9 by a ball and socket joint and forms a right angle with the displacer stem. The other end of the displacer rod driver 12 is rigidly connected to a rotary shaft 13. This connection rests on a knife edge pivot bearing 14. The rotary shaft is encased in a torque tube 15 which itself is located in the interior of the torque tube housing 16. The torque tube ends at the outer tube end process seal 17, which seals off the interior of the torque tube housing 16 from the controller 18. The controller 18 may be a type 2340 Transmitter as manufactured by Fischer Controls Company. The rotary shaft 13 passes through the outer tube end process seal 17 and into the controller where a small angular rotation of the shaft caused by movement of the displacer is converted into electrical signals to indicate the liquid level in the vessel.

The apparatus of this invention is shown attached to the exterior of the torque tube housing preferably at two locations 19 and 20 which are threaded tubular fittings screwed into holes drilled in the housing. The fittings may alternatively be welded to the housing. The one fitting 19 is located near the outer tube end process seal 17 and the other fitting 20 is located near the pivot bearing end of the torque tube housing. Respective stainless steel tubes 21 (copper or materials may be used) preferably meet in a Y joint 22 to which a valve 23 is connected for regulating the flow of cleaning fluid from a container or supply source 24 through the stainless steel tubing to the torque tube housing.

In operation, the flow of cleaning fluid from a container to the housing of the liquid level sensor flushes solid particles off of and away from the movable parts of the sensor, thus preventing jamming of these parts and promoting more reliable operation of the sensor